Figure 1:
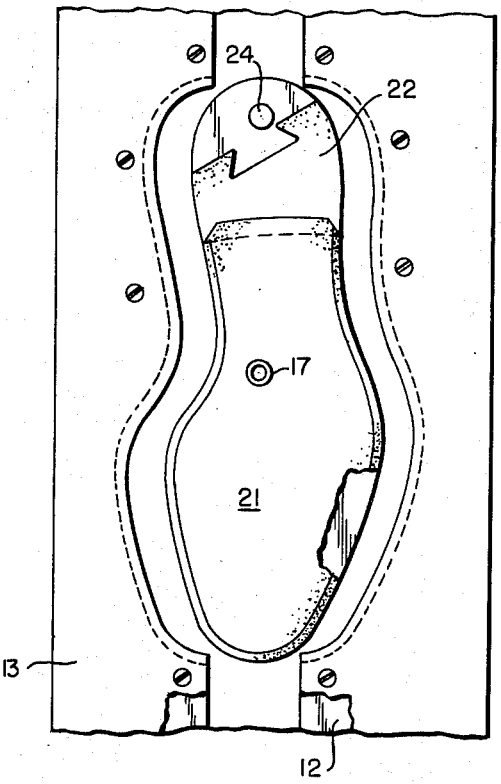

March 30, 1965 J. J. FERREIRA 3,175,249
INJECTION MOLDING APPARATUS
Filed May 24, 1963 2 Sheets-Sheet 1

INVENTOR.
Joseph J. Ferreira
BY
Kenway, Jenney & Hildreth

March 30, 1965 J. J. FERREIRA 3,175,249
INJECTION MOLDING APPARATUS
Filed May 24, 1963 2 Sheets-Sheet 2

INVENTOR.
Joseph J. Ferreira
BY Kenway, Jenney & Hildreth
Attys.

United States Patent Office 3,175,249
Patented Mar. 30, 1965

3,175,249
INJECTION MOLDING APPARATUS
Joseph John Ferreira, Raynham, Mass., assignor to Joseph F. Corcoran Shoe Co., Inc., Stoughton, Mass., a corporation of Massachusetts
Filed May 24, 1963, Ser. No. 283,047
4 Claims. (Cl. 18—30)

This invention carries into a new field the now-popular injection process of molding soles or shoe bottoms. It provides an injection process for incorporating in the tread of the shoe preformed leather sole pieces, such as full soles, taps, heel lifts or other inserts. Thus shoes which have heretofore been restricted to treads of PVC or other plastic material may now be offered to wearers who insist or prefer to walk on sole leather.

The injection process as heretofore practiced is characterized by forming a mold cavity of which the lasted shoe bottom is one component and a spaced sole mold is another. Then PVC or other plastic is injected in fluid form into this cavity so that an outsole of finished contour is molded directly upon the shoe bottom. The sole molded in this manner is an integral piece of plastic composition extending continuously from toe to heel with finished side edges, imitation wheeled welt margin, and embossed tread surface. A machine designed for carrying out this injection process is fully described in United States Letters Patent 3,006,032, October 31, 1961.

I have discovered that by properly placing and securing in position a preformed leather sole blank upon the inner surface of the sole mold, the injection step may now be carried out with the result that the leather sole blank becomes fully incorporated in the molded sole in flush relation therewith and permanently bonded in place in the shoe bottom. The plastic material will be found to form a continuous layer or ply or mid-sole between the outsole and the shoe bottom and also to form a marginal band about the edges of the outsole. The outsole is thus fully exposed and may be boned or otherwise ornamented in the manner of high grade leather soles. The entire exposed margin of the composite sole formed in this manner is mold-finished in shape and surface texture.

The present invention comprises new and improved apparatus for incorporating in a shoe bottom by injection molding a preformed leather sole piece. It includes cooperating movable and stationary members, one having a projecting nozzle for penetrating and holding a preformed and perforated sole piece and for discharging a viscous vinyl compound through the sole piece, and the other presenting the contour of a lasted shoe bottom in position to mold the vinyl compound as so discharged. More specifically the apparatus may include a stationary mold member having an upright sole engaging face and a nozzle projecting outwardly therefrom in position to penetrate and support a perforated sole piece The nozzle has connections for supplying PVC or other curable plastic compounds to the said nozzle for discharge through the sole piece and a cooperating carrier member having provision for holding a lasted shoe and being movable to present the bottom of the shoe opposite to and spaced from the face of the stationary mold member and the sole piece supported or suspended thereon by the nozzle. As the PVC is discharged through the nozzle it spreads in the cavity between the sole piece and the shoe bottom forming a bonding mid-sole and a finished marginal surface about the marginal edge of the preformed leather sole. The PVC is cured or polymerized for a suitable interval under heat and pressure in situ and in the shape determined by the lasted shoe bottom or a mold of the same contour.

An optional feature of the invention consists in the provision of means for adjusting the effective length of the nozzle to accommodate sole pieces of different thicknesses which are to be held upon the upright face of the stationary mold. Good shoemaking requires that the nozzle should protrude to a distance approximately equal the thickness of the outsole but not beyond that point.

These and other features of the invention will be best understood and appreciated from the following description of a preferred embodiment thereof selected for purposes of illustration and shown in the accompanying drawings in which—

Figure 2:
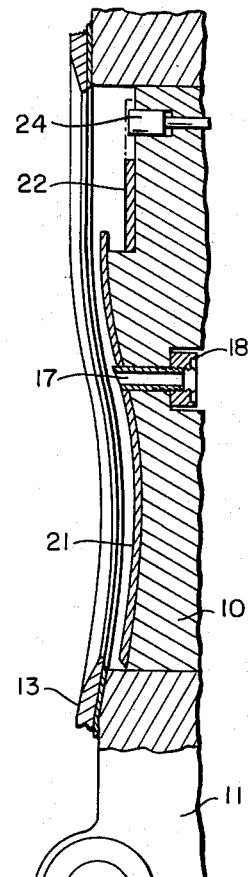
Figure 2:
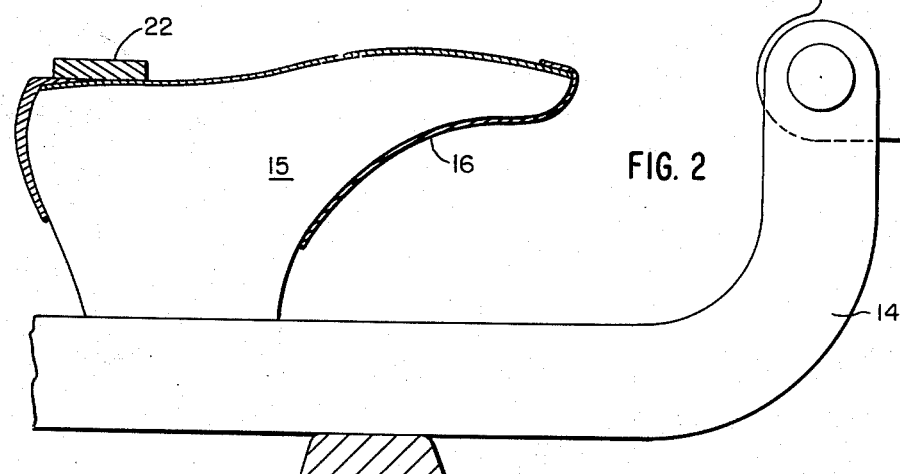
Figure 3:
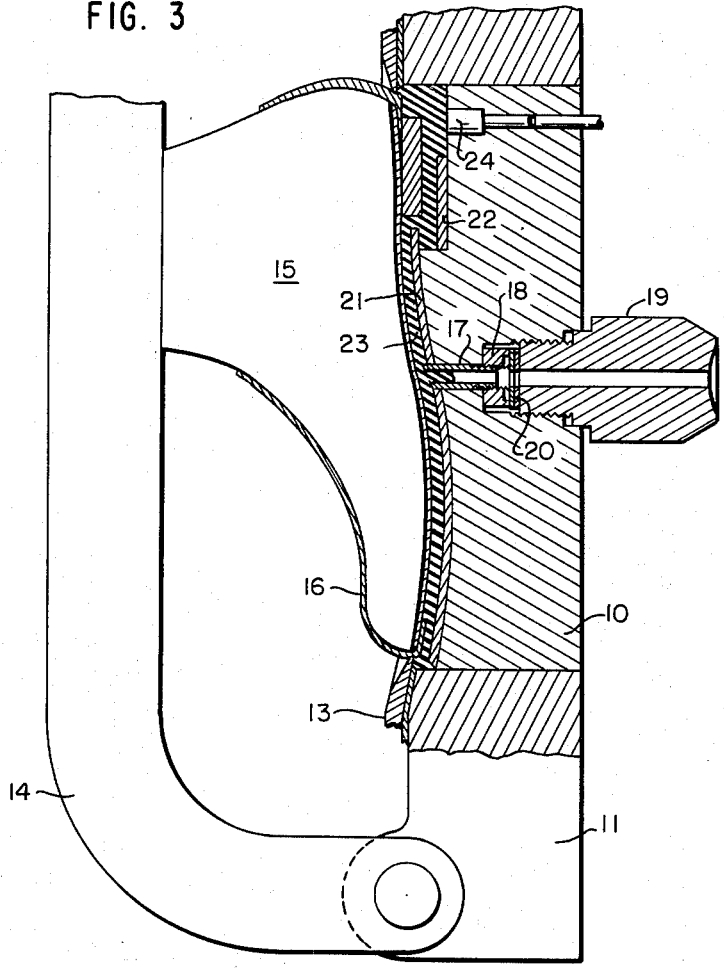

FIG. 1 is a view in elevation of the sole member of the mold showing a sole piece in place thereon, FIG. 2 is a corresponding view in longitudinal section, with the addition of the lasted shoe support shown in open position, and FIG. 3 is a similar sectional view showing the mold in closed condition.

As will appear from the following description the nozzle is a salient feature of the invention. It has two important functions. In the first place it supplies convenient and positive means for locating a perforated sole piece in the assembled mold so that it defines in part the shape of the mold cavity. In the second place, since it actually penetrates into the mold piece, it prevents PVC from spewing out on the wrong side of the sole, that is to say, on the surface next to the sole mold which is to become the tread face of the finished shoe.

In the accompanying drawings are shown mold members which are movable as an assembly in a machine having a source of PVC which is maintained at an injection temperature of 350–390° F. The mold members include a sole mold 10 mounted in a frame 11 and having an upright face which is curved to an approximate contour of the lasted shoe bottom. At the opposite sides of the sole mold are side mold plates to which are secured welt-forming plates 13 adapted to mold the marginal edges of the injected PVC into the shape of a conventional welt.

To the frame 11 is hinged an arm 14 carrying a last-like form 15 upon which the lasted shoe 16 is placed. The sole mold 10 is shaped to receive the sole piece with its toe end down and the hinged arm 14 is so arranged as to present the lasted shoe bottom in complementary position when the mold is closed.

The sole mold is provided with a nozzle 17 arranged to project outwardly from the face of the mold in a position approximating the shank of the sole piece. The nozzle is received in a bore in the mold plate 10 and has threaded connection with a nut 18 having a screwdriver slot by which the nut may be turned to advance or retract the nozzle. The nut 18 is backed up by a plug 19 which is threaded into the rear side of the sole mold. In adjusting the nozzle 17 it is contemplated that shims or washers 20 may be interposed between the nut 18 and the inner end of the plug 19 in order to back up the nozzle and prevent leakage of the PVC. The plug 19 constitutes a threaded connection by which PVC is delivered to the nozzle 17 and the plug in turn is arranged to register with tubular connections extending from the source of PVC not shown.

A sole piece 21 is shown in the drawings as positioned by and suspended from the nozzle 17. To this end it may be slightly tapered so that it will fit tightly in a hole provided for it in the preformed sole piece. The discharge end of the nozzle is beveled on the side toward the toe end of the sole piece in order to facilitate flow of the PVC in that direction.

The heel portion of the sole mold is recessed to receive a top lift 22 and at this point is located a tell-tale plunger 24 which is advanced by the PVC when the mold cavity has been entirely filled and thus serves to actuate a cutoff for the PVC.

In operation the preformed and perforated sole piece 21 is threaded upon the projecting end of the nozzle 17 and held thereby in position. The arm 14 is then swung upwardly bringing the lasted sole bottom into position to close the mold cavity as shown in FIG. 3. Hot PVC is then delivered through the plug 19 and discharged under pressure through the nozzle 17. It immediately spreads between the shoe bottom and the sole piece forming a bonding midsole 23, surrounding the top lift 22 and forming a continuous marginal band about the edges of the sole piece.

Having thus disclosed my invention and described in detail an illustrative embodiment thereof I claim as new and desire to secure by Letters Patent:

1. Apparatus for incorporating in a shoe bottom by injection molding a preformed leather sole piece, comprising a stationary mold member having an upright face for engaging a perforated sole piece and a nozzle projecting outwardly from said face in position to penetrate and hold the sole piece in substantially vertical position upon the upright face of the mold member, connections for supplying a viscous vinyl compound to said nozzle for discharge through the sole piece, and a cooperating carrier member having provision for holding a lasted shoe and being movable to locate the bottom of the shoe opposite to and spaced from the upright face of the stationary mold member and the sole piece supported thereon by said nozzle.

2. Molding apparatus as defined in claim 1, further characterized in that the nozzle is made adjustable as to the extent of its projection beyond the upright face of the stationary mold member.

3. Molding apparatus as defined in claim 1, further characterized in that the delivery end of the nozzle is beveled on the side directed toward the forepart of the sole piece supported thereon.

4. Molding apparatus for incorporating in a shoe bottom by injection molding a preformed leather sole piece, comprising a stationary mold member having a substantially vertical face for contact with a perforated sole piece, said mold member having a heel-forming recess at one end, and a nozzle projecting outwardly from said face at a distance from said recess and in position to penetrate and hold the sole piece in substantially vertical position upon the vertical face of the mold member with the heel end of the sole piece extending into the heel-forming recess, connections for supplying a liquid vinyl compound to said nozzle for discharge through the sole piece, and a cooperating carrier member for a lasted shoe movable to locate the bottom of the shoe opposite to the sole piece and the heel-forming recess in the mold member.

References Cited by the Examiner
UNITED STATES PATENTS

| | | | |
|---|---|---|---|
| 2,956,309 | 10/60 | Herbst | 18—30 |
| 3,006,032 | 10/61 | Baker et al. | 18—30 |

MICHAEL V. BRINDISI, *Primary Examiner.*